(12) United States Patent
Upton et al.

(10) Patent No.: US 11,943,226 B2
(45) Date of Patent: Mar. 26, 2024

(54) CONTAINER AND RESOURCE ACCESS RESTRICTION

(71) Applicant: International Business Machines Corporation, Armonk, NY (US)

(72) Inventors: Gregg Andrew Upton, Santa Clara, CA (US); Austin Willoughby, Voorheesville, NY (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 17/321,095

(22) Filed: May 14, 2021

(65) Prior Publication Data

US 2022/0368695 A1    Nov. 17, 2022

(51) Int. Cl.
*H04L 9/40* (2022.01)
*G06F 9/54* (2006.01)
*G06F 16/27* (2019.01)

(52) U.S. Cl.
CPC ............ *H04L 63/102* (2013.01); *G06F 9/547* (2013.01); *G06F 16/27* (2019.01)

(58) Field of Classification Search
CPC ....... H04L 63/102; G06F 9/547; G06F 16/27; G06F 9/468; G06F 21/32; G06F 21/6218
See application file for complete search history.

(56) References Cited

U.S. PATENT DOCUMENTS

| | | | |
|---|---|---|---|
| 6,377,994 B1 * | 4/2002 | Ault | .............. H04L 63/10 707/999.009 |
| 6,502,088 B1 | 12/2002 | Gajda et al. | |
| 9,152,811 B2 | 10/2015 | Franzki et al. | |
| 9,875,270 B1 | 1/2018 | Muniswamy Reddy et al. | |
| 10,579,692 B2 | 3/2020 | Levine et al. | |
| 2013/0305387 A1 * | 11/2013 | Fischer | ............... G06F 21/6218 726/28 |
| 2017/0075573 A1 | 3/2017 | Carpenter et al. | |
| 2017/0308621 A1 | 10/2017 | Wu et al. | |
| 2018/0032747 A1 | 2/2018 | Whelan | |
| 2018/0081924 A1 * | 3/2018 | Johnston | ............... G06F 16/278 |

(Continued)

FOREIGN PATENT DOCUMENTS

WO    2020046981 A1    3/2020

OTHER PUBLICATIONS

Morgado et al.; "A Security Model For Access Control in Graph-Oriented Databases", QRS IEEE International Conference on, pp. 1-8, Jul. 16-20, 2018.

(Continued)

*Primary Examiner* — Bruce S Ashley
(74) *Attorney, Agent, or Firm* — Mark Bergner

(57) ABSTRACT

A computer-implemented system and related method secures the access of a data object in a datastore by a remote system without user-specific credentials. The method comprises using a processor of a data resident operating system for verifying, using a security resource profile for the datastore, which access entity the remote system has access to, but without the user-specific credentials. The method also provides the security resource profile through a security application program interface (API) to the processor to determine whether access to the access entity should be allowed. The method allows the access to the data object by the remote system when the security resource profile exists and permits the access.

18 Claims, 5 Drawing Sheets

(56) References Cited

U.S. PATENT DOCUMENTS

| | | | |
|---|---|---|---|
| 2018/0103063 A1* | 4/2018 | Thurgood | G06F 21/604 |
| 2018/0152455 A1 | 5/2018 | Lee et al. | |
| 2018/0293397 A1 | 10/2018 | DeMember et al. | |
| 2019/0327271 A1 | 10/2019 | Saxena et al. | |
| 2020/0127993 A1 | 4/2020 | Mossler et al. | |
| 2020/0389452 A1 | 12/2020 | Edwards et al. | |
| 2020/0412769 A1* | 12/2020 | Yi | H04L 63/205 |
| 2021/0160339 A1* | 5/2021 | Salimi Jazi | H04L 61/5007 |

OTHER PUBLICATIONS

Veloudis et al.; "An Ontological Template For Context Expressions in Attribute-Based Access Control Policies", CLOSER 2017, 7th Inter. Conf. on, pp. 123-134, Apr. 24-26, 2017.

Yang et al.; "SHC: Distributed Query Processing For Non-Relational Data Store", ICDE IEEE 34th International Conference on, pp. 1465-1476, Apr. 16-19, 2018.

Siriah et al.; "MongoDB With Privacy Access Control", International Journal of Research and Review, vol. 5, Issue 6, pp. 72-79, Jun. 2018.

Atzeni et al.; "Uniform Access to Non-Relational Database Systems: The SOS Platform", CAiSE International Conference on, pp. 160-174, Jun. 25-29, 2012.

Mell, P. et al., "The NIST Definition of Cloud Computing", Recommendations of the National Institute of Standards and Technology, NIST Special Publication 800-145, 7 pages, Sep. 2011.

Grace Period Disclosure: IBM United States Software Announcement 220-049, dated Jun. 16, 2020. Inventors/contributors Gregg Andrew Upton and Austin Willoughby.

* cited by examiner

CONTAINER AND RESOURCE ACCESS RESTRICTION

STATEMENT REGARDING PRIOR DISCLOSURES BY THE INVENTOR OR A JOINT INVENTOR

The following disclosure is submitted under 35 U.S.C. 102(b)(1)(A): DISCLOSURE: IBM® United States Software Announcement 220-049, dated Jun. 16, 2020—IBM® Data Replication VSAM® for z/OS® Remote Source provides new source engine for remote capture from IBM® Z VSAM® logs. Inventors/contributors Gregg Andrew Upton and Austin Willoughby.

BACKGROUND

Disclosed herein is a system and related method for container and resource access restriction, and, in particular, for a security administrator to restrict access to specific containers hosted at well-known IP addresses and restrict access to resources through resource profiles for well-known users.

SUMMARY

According to one aspect disclosed herein, a computer-implemented method is provided for securing the access of a data object in a datastore by a remote system without user-specific credentials. The method comprises using a processor of a data resident operating system for verifying, using a security resource profile for the datastore, which access entity the remote system has access to, but without the user-specific credentials. The method also provides the security resource profile through a security application program interface (API) to the processor to determine whether access to the access entity should be allowed. The method allows the access to the data object by the remote system when the security resource profile permits the access.

According to other aspects, a related system and computer readable media containing instructions for executing the method are provided.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:

TABLE 1

| \multicolumn{2}{c}{General Acronyms} | |
|---|---|
| API | application program interface |
| ARM | advanced RISC machine |
| CD-ROM | compact disc ROM |
| CMS | content management system |
| CoD | capacity on demand |
| CPU | central processing unit |
| CUoD | capacity upgrade on demand |
| DPS | data processing system |
| DVD | digital versatile disk |
| EVC | expiring virtual currency (a virtual currency having an expiration date, or subject to other virtual currency usage rules; local virtual currencies with expiration dates) |
| EVCU | expiring virtual currency (units) |
| EPROM | erasable programmable read-only memory |
| FPGA | field-programmable gate arrays |
| HA | high availability |
| IaaS | infrastructure as a service |
| I/O | input/output |
| IPL | initial program load |
| ISP | Internet service provider |
| ISA | instruction-set-architecture |
| LAN | local-area network |
| LPAR | logical partition |
| PaaS | platform as a service |
| PDA | personal digital assistant |
| PLA | programmable logic arrays |
| RAM | random access memory |
| RISC | reduced instruction set computer |
| ROM | read-only memory |
| SaaS | software as a service |
| SLA | service level agreement |
| SRAM | static random-access memory |
| VCUR | virtual currency usage rules |
| WAN | wide-area network |

Data Processing System in General

Figure 1A:
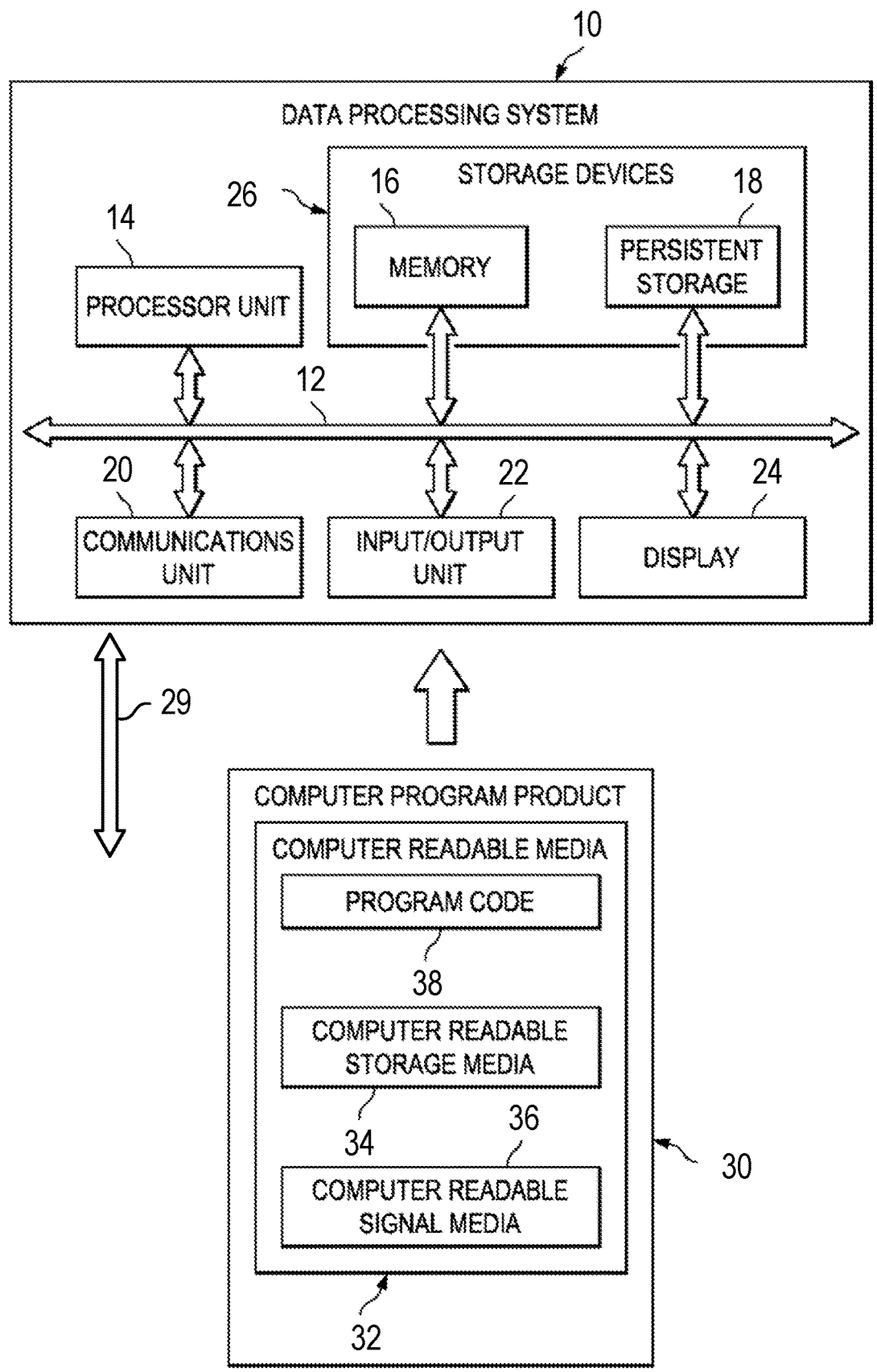
FIG. 1A is a block diagram of a data processing system (DPS) according to one or more embodiments disclosed herein.

FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile storage device. The non-volatile or persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card or other form of an I/O processor. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
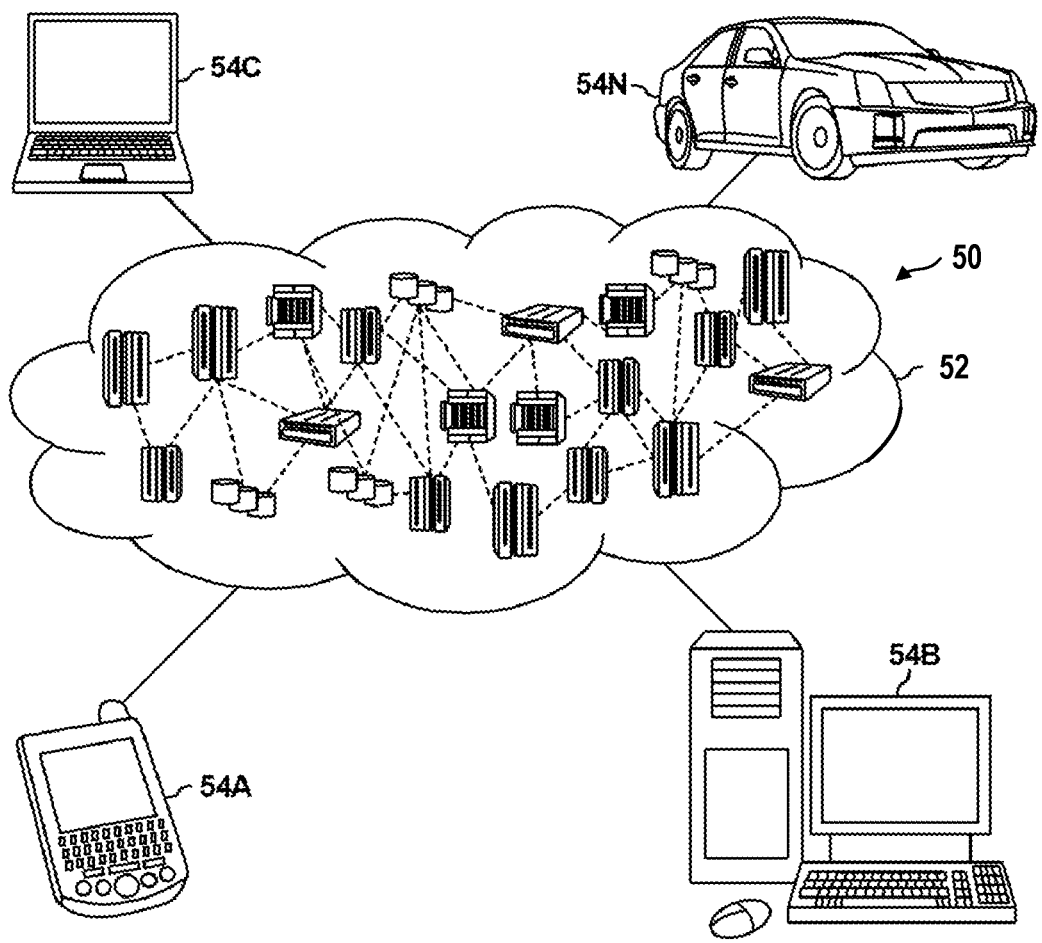
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
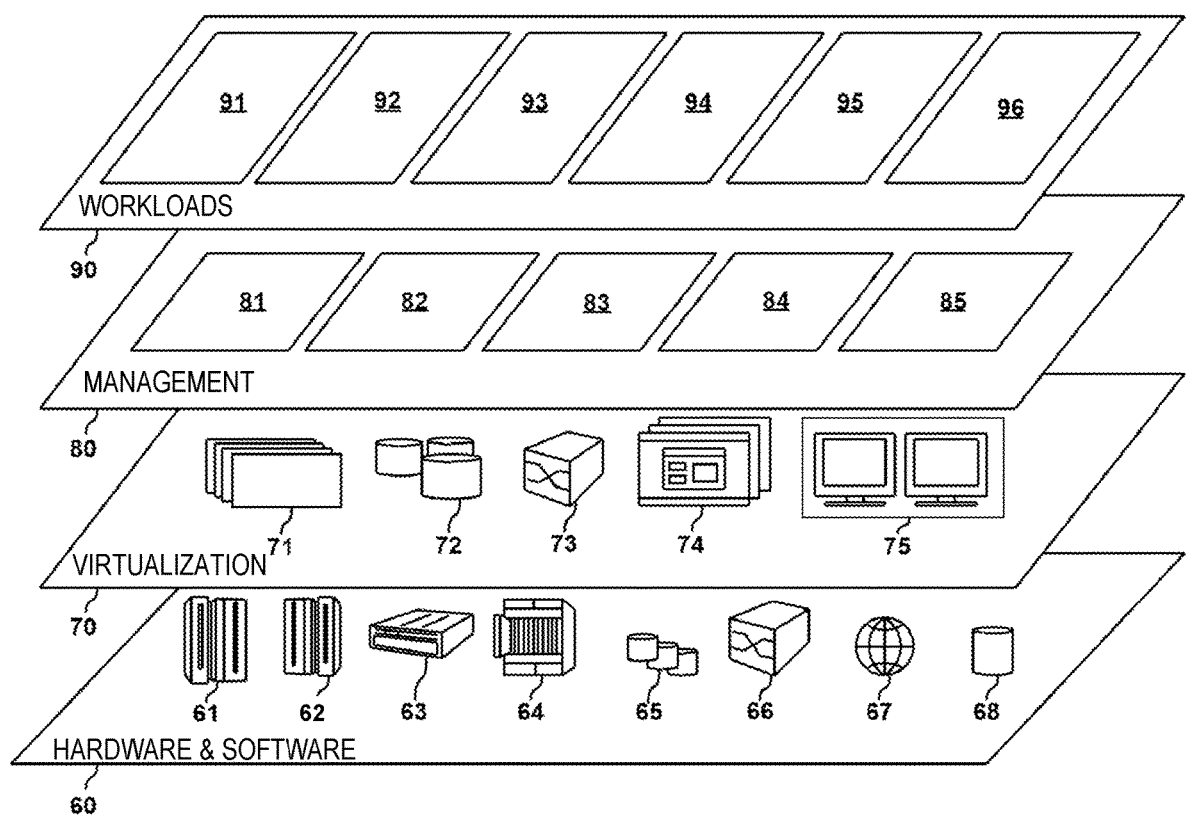
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing elements 96.

Any of the nodes 50 in the computing environment 52 as well as the computing devices 54A-N may be a DPS 10.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable cable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Container and Resource Access Restriction

The following application-specific acronyms may be used below:

TABLE 2

| Application-Specific Acronyms | |
|---|---|
| ACEE | Accessor Environment Element |
| APF | authorized program facility |
| AT-TLS | Application Transparent Transport Layer Security |
| CCTDOMA | clients that connect over TCP/IP for definition, operations, and monitoring architecture |
| CDC ® | Change Data Capture |
| CICS | customer infdormation control system |
| CLI | Call-level Interface |
| DBMS | database management system |
| DSN | data set name |
| ESDS | entry-sequenced data set |
| ESM | external security mechanism |
| IMS | information management system |
| IP | Internet Protocol |
| IPSec | IP security |
| JDBC | Java Database Connectivity |
| JES | z/OS job entry subsystem |
| KSDS | key-sequenced data set |
| LDAP | Lightweight Directory Access Protocol |
| LDS | linear data set |

TABLE 2-continued

| Application-Specific Acronyms | |
|---|---|
| LPAR | logical partition |
| ODBC | (Microsoft) Open Database Connectivity |
| RACF ® | resource access control facility |
| RHEL ® | Red Hat Enterprise Linux ® |
| RRDS | relative record data set |
| SAF | security authorization facility |
| SQL | structured query language |
| STC | started task control |
| TCP | Transmission Control Protocol |
| TLS | Transport Layer Security |
| VSAM ® | Virtual Storage Access Method ® |
| z/OS ® | z-Architecture Operating System ® |

Described herein is a system and related method for a security administrator to restrict access to specific container deployments hosted at established or well-known IP addresses and to restrict the accessible resources through resource profiles permitted to a well-known user, thereby allowing well-known user access control while avoiding the need for the well-known user to have or provide security credentials.

In the system disclosed herein, security validation is performed on the host system (data resident operating system) where the data being replicated (host data or source data in a datastore) resides. The host data is accessed and sent to a container by a job or a started task that is running on that host system. This job or started task is also responsible for reading the contents of DBMS-created logs that report changes to the host data. These changes are also sent to the container. The job (or started task) on the system where the source data (datastore) resides has a user ID associated with it (this user ID being that of the well-known user, which may be obtained using, e.g., operating system-provided functions). A security administrator grants rights to access the host data to be read, DBMS created logs, and other local datasets, in order for the system to function properly.

The well-known user ID may be obtained by the remote log reader (the software running in the job/started task) and the remote log reader may construct compound names consisting of the name of the remote log reader job/started task, the IP address of the container, and additional application-provided names.

The remote log reader accesses the host security system to create an access token based on the well-known user ID, which, in the case of an SAF interface, may be created without providing a password, passphrase, etc. Using the access token (e.g., an ACEE in the case of SAF), the remote log reader may issue security calls against a configured resource profile name, providing the compound name to determine if a rule exists that allows access to the resource name for that profile. In some embodiments, CONTROL access might be sought, but this is implementation dependent. Significantly, if a resource profile exists and the well-known user ID has the proper authority, then processing is allowed to continue, otherwise processing is not allowed to continue.

A first level of validation may occur by checking that the address space is running under the expected name. This keeps someone from trying to use a replacement server at the port. Profiles may start with the jobname to separate environments and ensure the address space making the SAF request is using the rules defined for it.

The second level of validation occurs when a container connects to the remote log reader, which allows for a basic check to determine if this is a well-known container deployment. The IP address is obtained from the TCP/IP stack by the remote log reader, making the IP address difficult to spoof. The second level of validation, in essence, indicates that a host security administrator allows a container hosted at a specific remote IP address to connect to the remote log reader.

Although spoofing IPs is common for attacks on a network, it requires someone to take exceptional steps to modify IP packets. Embodiments disclosed herein prevent a more typical scenario where someone is trying to setup a clone system and receive data they are not supposed to see. Most customer networks are on the lookout for suspicious traffic that might be spoofing, and are using firewalls and other protections to keep unknown users outside the network. An assumption here is that anyone trying to spoof the IP address has already gained access to a restricted network.

The third level of validation is subscription verification. In reality, this may just be a name, and the operating system service is likely to support multiple service requests. The third level validation may be thought of as determining "is the container running at this IP address and requesting this service allowed?" In the discussion below, there may be more context because a subscription has an end destination. The subscription may be referenced by a subscription identifier.

The fourth (final) level of validation may use an object name for an (any) object. By way of example, the object may be a file or a database. For a data virtualization "service" it may make sense to create various types of profiles.

In one embodiment disclosed herein, a replication scenario is provided in which a third part of a constructed name described below represents a subscription. In this embodiment, a subscription comprises one or more replication objects that relate a source object to a target object that is located at a remote destination or target system. In this embodiment, the source object may be a file, such as a VSAM file, and the target object could be, for example, a relational table, a Hadoop file, Kafka queue, or determined by an application call at the target to handle or dispose of the change. This embodiment may also apply to reading the contents of the source object. The third level of validation indicates that a host administrator allows the contents of each source object referenced by the subscription to be sent to the target IP address. This may include reading the contents of the source objects and capturing their changes.

The four levels of validation may correspond to a constructed name in the form <jobname>.<IP>.<subscription>.<object>. Additionally, it may be possible to construct a profile name using wildcards, in the form of, e.g., <jobname>.<IP>.** (or ending with ".*.*", ".*"), or any other form representing a wildcard. This wildcard example would be interpreted as "this IP can have anything that the job can access". Thus, the constructed name may identify any access entity that is permitted access. The security administrator may setup security resource profiles 234 that include wild cards for matching purposes. The application (the remote log reader 220 in this embodiment) may construct the compound names and the ESM may perform the wild card evaluation and determine if there is a profile entry that matches the compound name provided.

A fourth part of the constructed name includes the source object name. In one embodiment, this fourth part is a VSAM data set name. This allows a host security administrator to allow/control reading/capturing changes for a specific file from a container hosted at a specific IP address targeting a specific destination (via the subscription name).

In theory, these third and fourth parts of the constructed names could represent anything. In various embodiments, the container application provides these names which are "well known" to the host security administrator who has setup the required resource profiles to allow the application to function. This may include generic or masked profiles mentioned above in the wildcard form <jobname>.<IP>.**. If an unknown IP address or unknown name is provided, then whatever function the application is trying to perform is not allowed.

Conceptually, the container connects to a "service" that is running on an operating system, such as z/OS. A generic validation check that may be performed is whether the container running at some IP address is allowed to use any function supported by the operating system service. IP port security may be used, but it is a much more complex process. Various embodiments disclosed herein may make using these generic resource profiles easier to setup and maintain by administrators.

Various embodiments described herein focus on functional security versus simple authentication of credentials or identification of an individual for a potentially compromised account. In these embodiments, the user ID associated with the operating system remote log reader address space may be used for security profile checking purposes. No authentication is required (user-credentialless authentication access), and this user ID may be used to check to determine if a security administrator has created a rule (security resource profile) that has authority for that user ID for a compound resource name constructed from the operating system remote log reader job/started task name and the IP address of the container for basic access authorization purpose. Additional authorization checking may also be performed by appending the subscription source system ID (such as a unique one- to eight-character identifier) that is used as an indirect method of controlling/authorizing the right to capture and replicate changes to a set of related objects (VSAM files in this example) to a target location. At this point, it would be very difficult for a hacker to penetrate the network, as they would need to: 1) be inside the network; 2) be altering packets to spoof the correct IP address of a permitted container; and 3) know the source system ID permitted from the correct IP address. This latter part requires either intimate knowledge of the replication environment or decoding good traffic that should be encrypted through TLS. Each step of the name implemented raises the bar for an attacker and also narrows the impact if an attacker is able to breach these systems.

By way of example, on a z/OS platform, security calls may be APF authorized so that this address space may be granted a higher privilege so that it could create ACEEs and do resource profile checking. In sum, the user credentials per se are not being validated—rather the system is asked if the user is permitted to access a resource.

A subscription establishes a connection between the source (container) and a target server that provides the indirection mechanism. The job or started task of the service running on the data resident operating system has a valid user ID associated with it—the valid user ID is needed for the job or started task to be running. A normal user cannot simply start a job with the same name on the OS at some other port and bypass the checks. Authorization was given based on the STC/JOB user having access to the resource profiles created with the jobname. Sites also typically reserve ports for specific job names.

In an embodiment, one possibility may be to use an SAF interface option to create a security environment (for example, an ACEE) by just providing the user ID without a password. This security environment/ACEE may subsequently be used for resource profile checking, even though the security environment was created without authentication.

Although described for an example implementation, there is no real requirement for control authority. When a security administrator sets up a rule that associates a user ID with a resource profile, the security administrator may identify the access level. Of significance, the remote log reader's user ID may be associated with the resource profile name(s) constructed by the remote log reader service and has the correct access level (or control) for the resource name.

The resource name discussed herein may comprise at least two parts: the name of the address space where the remote log reader is running and the IP address of the container that is connecting to the remote log reader. However, additional (more granular) authorization checks may be performed by appending the subscription (short) name after the IP address. In such embodiments this may be used to "authorize" replication of the data objects to a specific target IP address that is indirectly identified by the subscription name. It thus may be possible to authorize the refresh and capture of changes to a specific destination for specific data objects themselves by appending their names after the subscription name. This approach of appending names after the IP address can be generalized to allow the process running on the host or data resident OS (such as on the remote log reader in this embodiment) to perform various functions on behalf of the process that is running at a specific IP address.

Various embodiments discussed herein may be operating system-based with the generalized security interface being provided that may be supported by all security vendors that provide operating system support. Various embodiments disclosed herein also include a method to allow an organization to control where changes get replicated without having to provide explicit user identification—these embodiments may utilize an existing security mechanism. Various embodiments further include a method for providing functional security to allow access to the operating system remote log reader only from specific IP addresses. These embodiments further provide an indirect mechanism to restrict replication of changes from specific objects to a known target location (using a subscription model). Various embodiments are security related and provide a method to determine whether a remote IP address can capture changes made to a dataset, e.g., a VSAM dataset (or access its contents for refresh purposes), and whether the contents/ changes to this dataset can be "sent" to a target location (using the subscription model). The functional security mechanism may be used to restrict access to a system to specific IP addresses and control the distribution of changes (and data via refresh) to specific target IP addresses using the subscription model.

Figure 2:
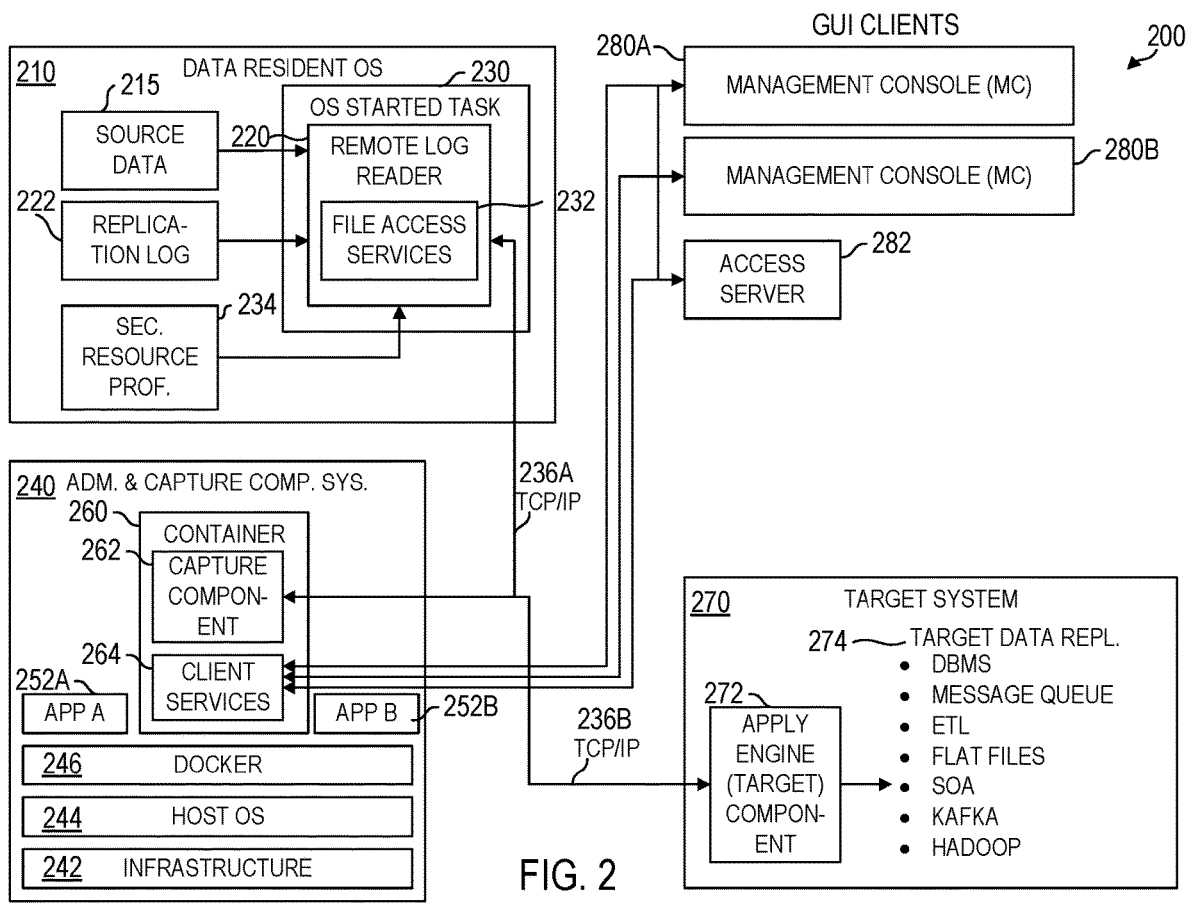
FIG. 2 is a block diagram that illustrates, according to some embodiments, an implementation environment having various components of a system in which various embodiments of a system and method may operate.

FIG. 2 is a block diagram that illustrates, according to some embodiments, an implementation environment 200 having various components of a system in which various embodiments of a system and method may operate. These embodiments are not intended, however, to limit the invention in any way. The implementation environment 200 may be, for example, a cloud computing environment 52, and comprise nodes 50 that each may be, e.g., a DPS 10. The various components may be implemented as, e.g., application processing elements 96. The components may comprise a (native) data resident operating system 210 (also referred to as a (data) source system), administrative and capture components 240, and a target system 270, where the target system 270 may serve as a mirror/replicator for the source data 215. In a general sense, access by a remote system (i.e., a system remote from the data resident OS 210, such as the administrative and capture components system 240 and the target system 270), may be provided based on a non-user-specific security credentials that are provided in a security resource profile 234.

The implementation environment 200 may also comprise administrative tools, including management consoles 280A, 280B (referred to collectively as 280), for implementing the clients that connect over TCP/IP for definition, operations, and monitoring architecture (CCTDOMA) described herein. One possible implementation of CCTDOMA may be the Microsoft Windows® Classic Data Architect (CDA) Change Data Capture (CDC). The management consoles 280 may be used to define and manage subscriptions, and may communicate with the container 260 (e.g., to map non-relational data and to update configuration parameters in the data) as well as the target 272. The management consoles 280 may also communicate with the access server 282, which stores source/target user credentials (user IDs and passwords) that can be used to by the management consoles 280 to establish connections with the source/target servers.

The data resident operating system 210 may comprise source data 215 and that may be used in, e.g., a VSAM® sphere data services component that stores the data that is read by the file access services 232. When applications update the VSAM® sphere data 215, the changes are logged in the replication log 222, which has already been read by the file access services 232. The data resident operating system 210 may further comprise a remote log reader component 220 that interfaces with, e.g., a replication log 222. File access services 232 may be a part of the remote log reader component 220. Mirroring/replication is the process of continuous replication of changed data from the source data 215 to the target system 270.

The administrative and capture components 240 may serve to offload certain administrative and capture functionality from the data resident operating system 210 in order to, e.g., reduce processing load on the data resident operating system 210. The administrative and capture components 240 may reside on their own computer, such as a DPS 10, or may be a part of another computer or device. Functionally, the administrative and capture components 240 operate on a peer level similar to the target system 270. The administrative and capture components 240 may comprise hardware and software infrastructure 242, a host OS 244 (for example, Linux®, Microsoft Windows®, or any other operating system or platform), one or more containers 260 that operate, e.g., within a Docker® or Podman environment 246. Other container-based application(s) 252A, 252B may also run at this location, and/or may run on the data resident OS 210. The container 260 may comprise a capture component 262 as well as client services 264. The file access services 232 may run on an operating system 210, based on connections received from a capture component 262 running in the container 260, such as a VSAM remote source for z/OS®. The container 260 may serve to capture changes to nonrelational mainframe data, and deliver these changes to, e.g., relational databases, producing an accurate relational replica of mainframe data on supported target databases in near real-time (from the perspective of an application creating or using the data). In this embodiment, the capture component 262 may use a control connection 236A to communicate with the data services file access data component 232 to request access to specific files for refresh or capture purposes using a subscription model. The target system 270 has an apply engine 272 that applies the data replications to a target data replica 274 for a variety of databases, and may be connected to the capture component 262 with a target connection 236B. The source server replication components may consist of the container 260 with its capture component 262, and the OS started task 230 with its remote log reader component 220. while the target system replication component is the apply engine 272. The remote log reader component 220 architecture has the capture component 262 moved to run on a different operating system (host OS 244 running on the administrative and capture components system 240) while the remote log reader component 220 remains on the data resident operating system 210 where the databases (e.g., source data 215) and logs (e.g., replication log 222) exist.

In more detail, in the mirroring/replication process, when changes are made to data by an application (which are generally made by another application running in another address space running on the data resident operation system 210 (or some other related system if there are multiple operating systems working together)), the changes may be logged into the replication log 222, and those changes may later be read by the remote log reader component 220 and pushed to the capture component 262 where data transformations may be done, and then sent to a target apply engine 272 to keep the target data replica 274 in sync with the source data 215. A refresh is a process that synchronizes the target table on the target data replica 274 with the current contents of the source table in the source data 215. Data may be pulled from a data set with minimal processing and sent to the capture component 262, which may perform all columnar work, transformations, and data type changes. The data may then be replicated in a replication target apply engine 272.

Operating system-based replication products that include certain elements, such as the remote log reader 220, a capture component 262, and an apply engine component 272 (or those that use a remote log reader approach), may divide source engine (or server) components into a distinct data access or services component that runs on the operating system with a capture component 262 that resides elsewhere, e.g., on the administrative and capture components system 240. The capture component(s) 262 may include temporary files and transactions queues staged on the administrative and capture components system 240, which are staged on the target system 270 (for the record being applied). One responsibility here is to cache the changes to the source databases using transaction (unit-of-recovery) semantics until a commit or rollback record is received. If the transaction is rolled back, the cached changes are discarded. If the transaction is committed, then the changes can be sent to the apply engine 272. Committed changes are sent in commit sequence. One feature and advantage of these embodiments is that the do not need to convert the data from its native format into an SQL representation and then convert it to "wire" format, which the target engine is expecting. This is done on a per column basis and becomes very expensive when you have a large number of columns. Because of this, the remote capture architecture is advantageous.

When the replication product captures non-relational data, then the remote log reader component 220 may also support the ability to read the source database or file on the source system 240 since these objects may be difficult to access from a container 260 environment. Relational products may use a client Java Database Connectivity (JDBC) or Open Database Connectivity Call-level Interface (ODBC/CLI) driver for refresh purposes which can directly interface with the database management system (DBMS) for refresh purposes.

In relational products, one area of potential focus is on the task of defining the replication environment. In various embodiments discussed herein, the container is presented as a mechanism to isolate the data scientist from the perceived complexities of dealing with a mainframe data source. Defining security profiles to control access to the operating system data and replication logs must be robust, but also simple enough to not slow access down or appear as a roadblock or bottleneck when defining the replication environment. These steps are preferably as invisible (transparent) and seamless as possible.

The administration of one of these relational products that uses a remote log reader component is focused on the container 260. Individuals working with the replication product (e.g., a data scientist) are typically associated with the line of business and related applications— normally these individuals have little or no knowledge about the operating system and typically do not have access rights to the operating system or data that needs to be replicated.

The replication solution may typically collect authentication information (e.g., user ID and password) that an administrative user can use to connect to the source (capture) component 262 and target (apply) component 272, and may also allow the specification of secondary authentication information that can be used to connect with the source database system 215 or target database system 274. For the purposes of this disclosure, the database system 215 is accessed by the remote log reader and secondary authorization information is used to verify that the replication product has the rights to access the database (or file) objects that are referenced by the subscriptions (sets of application related data or grouping object (grouping of objects for data)) that have been defined.

If the remote log reader 220 has access to the secondary authorization information, the remote log reader 220 could either create an ACEE using the secondary authorization information, or use an existing ACEE, to access the data source (215) or replication log (222) using the secondary authorization context or continue to use the default context. However, the remote log reader 220 issues the similar security checks that are done for the source data 215 and/or by the replication log 222 to see if the secondary authentication ID is authorized to access those objects.

The secondary authentication information combines the well-known IP address with a known subscription name. If this compound name matches security resource profiles 234 defined by the site security personnel, then replication is allowed. The "secondary" nature of this information is that the user does not need explicit rules for access to the data; the fact that the user can access the IP address and subscription is adequate, because the system has been configured to accept this combination of elements as properly allowing access to this source data. In order to restrict a particular user from accessing the data, the user should be prevented from accessing the IP address. The IP address of the container 260 may be obtained using, for example, native API's by the remote log reader 220 for the container 260 that is trying to connect to the process (capture component 262) that, in this case, will be accessing the source data 215 or the replication log streams containing the changes to the source data 215.

The presently disclosed system may be distinguished with regard to a non-containerized system where all components run on the data resident OS 210 system. With regard to secondary authentication information, due to limitations in the non-containerized implementation and concerns about the security requirements of the people that are defining and administering the subscriptions used, a better approach has been developed that is described herein. Typically, when a management console 280 is launched, a user ID and password must be provided. This is validated against, e.g., a local Windows account or an LDAP server. Normally, in the management console 280, one may set up access to each source 215 and target engine/server and provide a user ID and password that may be managed by the access server 282. When a subscription is defined, depending on the target, additional user ID and password information may be provided that is necessary for the target engine to connect to and perform operations against the target database.

In some versions of the non-containerized implementation, the user ID and password managed by the access server may be validated using SAF calls using a security exit (provided as part of the product). However, in the container, there is no security exit, so any/all user IDs and passwords provided for a source running in the container are valid. The non-containerized implementation does support traditional SQL security so there is some control. However, security issues may remain for privileged accounts. In a container deployment, the configuration managers setting up the system (mapping and defining subscriptions) are likely to be going to a cloud target and typically have little or no knowledge of the source data and have no idea how to interact with the host (e.g., z/OS) system. Assuming the non-containerized system was able to validate the configuration manager's credentials, these configuration managers may not have a z/OS ID, and a z/OS security administrator will likely not want to grant the setup people access to the system and source databases/files.

Restated differently, the Classic system described above has both security and operational issues. Unless individuals that are authorized to access the database objects also set up the replication environment, there is a need to share secrets for the secondary authorization checking to work. In the container environment, the data scientist or other data user may not have credentials for the source database on the source system. Thus, such a user may only work with a replica of the data at the target system and not be able to access the source database objects on the source system directly. This either leads to: a) sharing of secrets with someone who is not authorized, or b) an authorized individual "entering" the authorization information into the tool, which is a violation of standard security policies. Typically, the authorization information consists of a user ID and password. Also, good security practices call for the password to have a limited lifetime, after which a new password must be provided. When these passwords are stored by the replication product, then (periodically) replication fails because the password has expired and a (new) valid one needs to be provided. Replication products also should not store this authorization information, since protecting and encrypting credentials may present areas for attack.

Thus, the presently disclosed system may be distinguished over the Classic system since it provides the data resident OS 210 (e.g., z/OS) security administrator a different option that is more functionally oriented—an option with which they can control where the data can be accessed from and (indirectly via the subscription) where the data can be sent and persisted as a target replica. This is done using the "well known" ID associated with the remote log reader 220, which can be obtained directly by the remote log reader 220, meaning there is no need to store valid secrets for the necessary access capabilities to work (e.g., using an STC/ JOB owner ID and the security resource profiles 234 created by SAF admin to protect the data).

Replication products may use TCP/IP to communicate between the capture component (source) 262 and apply component (target) 272 when a remote log reader component 220 is used. TCP/IP administrators may use IP security to control the connection 236B that can be established between the administrative and capture components system 240, target system 270, as well as the connection 236A that can be established between the administrative and capture components system 240 and the remote log reader 220. The data flowing on these connections 236 may be encrypted, using a tool, such as AT-TLS, that can be setup externally, or the replication product may provide automatic support for secure connections.

Various embodiments disclosed herein may use a combination of generic operating system security authorization facility (SAF) capabilities and TCP/IP capabilities to restrict access by a remote log reader component 220 that may be associated with the file access data services 232 of an OS started task 230 to the capture component(s) 262 hosted at a specific IP address(es). The TCP/IP connection 236A that connects the capture component 262 with the remote log reader 220 may send refresh data for the source data 215, or may provide insert, update, and delete operations for the files associated with a subscription from the replication log 222 to the capture component 262. The changes read from the replication log 222 by the remote log reader 220 are sent over the TCP/IP connection 236A to the capture component 262 of the container 260 where they are identified, transformed, and grouped as appropriate—the identification of log records and transformations and grouping constitutes the capture aspect.

The remote log reader 220 may call a security resource routine that provides a security resource profile 234 including resource names. Various embodiments may also utilize the data resident operating system 210 to further restrict names of subscriptions that can be deployed on the client and operating system files that can be referenced by a subscription. Thus, an important provision is that a connection occurred from a known/expected location, and once that is accomplished, various approaches to access may be implemented at different levels of granularity. This level of control may be obtained without the need for the capture component 262 to provide an operating system user ID, password information, or an IP address where the container 260 and capture component 262 are hosted. In sum, the data is transferred from source data 215 via the remote log reader 220 to the administrative and capture components system 240, with the capture component 262 in the container 260 transferring the data to the target data replica 274 using the apply engine component 272 on the target system 270.

Various embodiments provide that the data resident operating system 210 uses (or sets up) a security class (e.g., a default class may be SERVAUTH that may be overridden) and defines a security resource profile 234 for some combination of:

remote log reader address space name
    an IP address that can establish a connection with the remote log reader component 220;
    the name of a subscription that can connect from a specific authorized IP address; and
    the name of each object (such as a file) that can be associated with a subscription at a given IP address.

These resource profiles 234 may be defined in the SAF external security manager (ESM). The SAF may provide a common interface, such as RACROUTE, that can be used to interact with the ESM. The SAF interface might be supported by IBM (RACF®), and other products, such as Top Secret® and ACF2®.

A separate set of resource profiles 234 may be defined for each remote log reader component 220 deployed in a set of systems, such as Sysplex®, which is a set of systems (e.g., a set of data resident OSs 210, such as z/OS logical partitions (LPAR)) communicating and cooperating with each other through multisystem hardware components and software services to, e.g., process customer workloads. The resource profiles 234 may be stored under a same security class or different ones.

Figure 3:
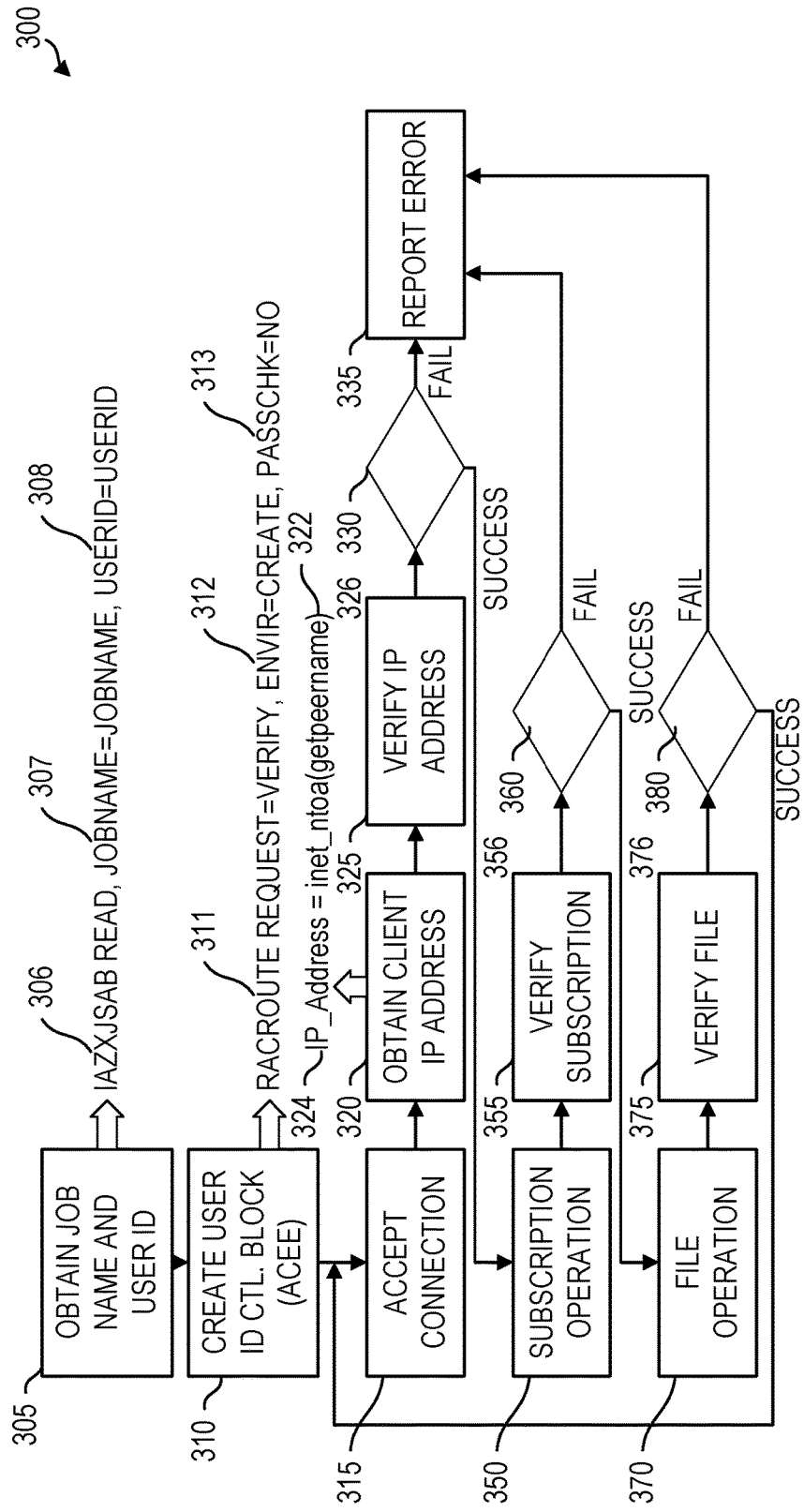
FIG. 3 is a flowchart that provides an example of a process 300 that may be performed for validation purposes, according to some embodiments.

FIG. 3 is a flowchart that provides an example of a process 300 that may be performed for validation purposes, according to some embodiments. The operations performed in the process 300 are discussed below on the context of the components shown in FIG. 2. In some embodiments, the process 300 may be performed, e.g., by the remote log reader component 220. Although specific types of components and operations are described in the following discussion and for the sake of simplicity, this discussion should be understood to relate to generic descriptions of such components and operations.

In operation 305, the remote log reader component 220 may use operating system APIs to obtain name of the process/job (or started task) and the user ID (e.g., JES2 OWNER) associated with the address space of the process/job. For a z/OS system, e.g., the running workload is generally controlled by a job entry subsystem (which is another address space) and this subsystem tracks things that are running using a combination of job names. The remote log reader component 220 may also use TCP/IP services to obtain the IP address where the capture component 262 is running (i.e., the container, such as a Docker container 245). In the example, an assembler macro IAZXJSAB 306 is used to obtain the name of the started task address space 307 that is used in constructing profile names and the user ID 308 that is used to determine whether access has been granted to a profile entry.

Logically, next, the create user identity control block operation 310 creates a user identity control block, such as an SAF accessor environment element (ACEE). The user identity control block may reside, e.g., in the private storage of the OS started task 230. Jobs, started tasks, or transactions on the operating system may have an associated identity. Such an identity may, for example, be a user ID that is a one-to-eight-character string. The ACEE is an example of a control block that represents the user's identity, and may contain the user ID and other related information used in establishing the identity of the user and the user's credentials. ACEEs may be created by an external security manager, such as a resource access control facility (RACF®), that enables the protection of system resources by making access control decisions through resource managers. The security manager may run within another address space (similar to the OS started task 230), and may also be responsible for managing and accessing the security resource profiles 234.

The ACEE may be created on request by resource managers, such as UNIX System Services, z/OS job entry subsystem (JES), customer information control system (CICS), information management system (IMS), etc. The control block may be created using, e.g., a z/OS SAF API such as RACROUTE REQUEST=VERIFY and INITACEE. For example, the ACEE may be created using the address space user ID without password validation when the initial connection 236A is received (operation 315 below) from the capture component 262. The initial connection reflects a connection between the capture component 262 and the remote log reader 220. The ACEE may be used to validate whether an owner has access to a specific profile entry 234. This may be performed, for example, using a RACROUTE verify request 311. RACROUTE is a macro provided by SAF that is understood by RACF®, which is a part of a z/OS Security Server. z/OS is an operating system for IBM® z/Architecture mainframes. The profile entry may be created by a system administrator and stored somewhere as, e.g., a part of the security resource profile 234. The resource profile name (specific profile entry) 234 is shown by way of example in FIG. 3 by the ENTITYX parameter 327, 357, 377.

In this example, password authorization checking is not requested (PASSCHK=NO) 313. While FIG. 3 shows that the obtaining of the job/owner information operation 305 and the creation of the user identity control block (e.g., ACEE) operation 310 is done once, other implementations may choose a more "atomic" approach where this is done prior to each authorization check. Not shown in FIG. 3 is the file access data services component 232 performing other initialization functions, such as creating a TCP/IP listen session, which allows file access data services component 232 to accept connections from the capture component 262.

In an accept connection operation 315, when a connection is received by the file access data services 232 from e.g., the capture component, the control connection 236A (TCP/IP connection) is accepted, and in operation 320, the client 240 IP address 324 is obtained. A series of TCP/IP APIs may be used to determine the TCP/IP address of the client 240 in, e.g., decimal notation. This may be done, e.g., using an inet_ntoa(getpeername) 322 call. The various verify calls are issued to verify the remote log reader component 220 user ID (identified in the user identity control block) has been granted control authority to the security class (verify connection/IP address 325, verify subscription 355, and verify file 375) and resource profile name provided. When a connection is received 315, this represents a first opportunity the operating system component 210 has to validate that the client is authorized, before any data has been received (operation 325, by verifying the IP address is an authorized one). However, it is also possible to defer validation until data has been received as part of an application handshake process.

In operation 325, the IP address of the client 240 is verified. The verification of the IP address may be performed by, e.g., calling an IP address verify routine 326. The IP address verify routine 326 may be performed using a macro, e.g., a RACROUTE REQUEST=AUTH 326A, with a resource profile name 327 (e.g., ENTITYX) comprising the log reader job name 327A (e.g., JOBNAME) and the capture component 262 IP address 327B (e.g., IP_Address).

Once the IP address has been obtained, the profile name is constructed and, for example, a RACROUTE call 326 is issued. In this example (1), the resource name (ENTITYX) is the JOBNAME 327 obtained from IAZXJSAB 306, followed by a delimiter (here a period), and then the IP address 324 that was returned by the API call inet_ntoa 324. In this example, the RACROUTE call 326 checks for CONTROL access 329, however, other embodiments may choose to use other or more granular access control methods (e.g., READ access for refresh requests and CONTROL for replication).

If the IP address verify routine 326 reports an error (330: FAIL) (or if the user identity control block, e.g, ACEE, cannot be created, as described above), then an "access denied" error may be returned (i.e., the error is reported in operation 335) to the capture component 262 by the remote log reader component 220 (data access component) on the operating system security administration 210, and the client 240 container's 246 connection 236A is terminated.

If this verify routine 326 is successful (330: SUCCESS), then access operations may continue. Assuming that access was granted to the capture component running at the Docker container, the capture component is allowed to continue communicating with the VSAM data services component and, at some point, will be sending a control message indicating that some operation needs to be done for a subscription.

In a subscription operation 350, a client subscription is verified. A security manager API call (e.g., a RACROUTE call, used herein solely for illustrative purposes) may be issued for subscription validation. The profile name has been updated to append the subscription name after the IP address, separated by a period. In this embodiment a subscription has a long name (up to sixty-four characters) and a short name (eight characters) that is unique at both the source and target, so in this embodiment, the short name (referred to as the source system ID) is used in constructing the resource name. This embodiment is illustrated using periods as separators between different name components, however, any valid character may be used. The verification of the client subscription may be performed by, e.g., calling a subscription verify routine 355. The subscription verify routine 355 may be performed using a macro, e.g., a RACROUTE REQUEST=AUTH 356A, with a resource profile name 357 (e.g., ENTITYX) comprising the log reader job name 357A (e.g., JOBNAME), the capture component IP address 357B (e.g., IP_Address), and a (short) unique subscription or grouping name 357C (e.g., source system ID (SrcSysID)) associated with the subscription that may be used to indirectly control or authorize a right to capture and replicate changes to data. A grouping object may represent the subscription that is a group of data source (e.g., VSAM data sets).

If the subscription verify routine 356 reports an error (360: FAIL), then an "access denied" error may be returned (i.e., the error is reported in operation 335) to the capture component 262 by the remote log reader component 220 (data access component) on the operating system security administration 210, and the client 240 container's 246 connection 236A is terminated. If this subscription verify routine 356 is successful (360: SUCCESS), then access operations may continue.

In a file operation 370, a source data 215 access may be verified. In this embodiment, the third level of validation is the file (data set name) level so that when a control message is received requesting a refresh for a file or informing the VSAM data services components that changes need to be captured for a specific file, another RACROUTE call is issued to see whether that is allowed or not. Here, in this example, the DSN is appended to the profile name separated by another period. Once again, after the RACROUTE call is issued, the results should be inspected. If authority has been granted, normal processing can continue. If authority has not been granted, an implementation-defined handler may be provided to deal with this situation. The verification of the client file access may be performed by, e.g., calling a file verify routine 376. The file verify routine 376 may be performed using a macro, e.g., a RACROUTE REQUEST=AUTH 376A, with a resource profile name 377 (e.g., ENTITYX) comprising the log reader job name 377A (e.g., JOBNAME), the capture component IP address 377B (e.g., IP_Address), a (short) subscription name 377C (e.g., source system ID) associated with the subscription, and a file identifier, for example a data set name (DSN), source data identifier, or base cluster name 377D, appended to the end.

If the file verify routine 376 reports an error (380: FAIL), then an "access denied" error may be returned for the associated subscription (i.e., the error is reported in operation 335) to the capture component 262 by the remote log reader component 220 (data access component) on the operating system security administration 210, and the client 240 container's 260 connection 236 may be terminated. If this file verify routine 376 is successful (380: SUCCESS), then access operations may continue.

By way of example, the file verify may be performed in the context of a refresh, and the file type may be a VSAM file. The Virtual Storage Access Method (VSAM®) is an IBM storage access method. VSAM comprises four data set organizations: key-sequenced (KSDS), relative record (RRDS), entry-sequenced (ESDS) and linear (LDS). The KSDS, RRDS and ESDS organizations contain records, while the LDS organization (added later to VSAM) simply contains a sequence of pages with no intrinsic record structure, for use as a memory-mapped file. When a refresh is performed for a VSAM file or the log reader is informed that capture operations are required for a VSAM file, the file verify routine 376 may be performed.

With this solution, there is no need to obtain, store, or transmit operating system authorization information from a container 260 environment. Adequate validation 325, 355, 375 may be done using the authorization ID (e.g., USERID that was returned from the IAZXJSAB READ request in operation 306) associated with the remote log reader component 220 deployed on the operating system security administration 210 which reduces the risk of unintended exposure of this information. Requesting the creation of an ACEE 310 without password validation also reduces administrative exposure and simplifies system administration. Further, code within the remote log reader component 220 may be used to obtain the job name 327A, 357A, 377A, authorization ID, and the client connection (the container's) IP address 327B, 357B, 377B which reduces the administrative cost and risk.

Various embodiments described herein provide a generic approach to resource validation which is simple to administer using a hierarchic naming convention that may be extended to any use as shown below:

TABLE 3

Naming Convention Components

Scope  Source Location  Object Name 1  Object Name 2  Object Name n

In Table 3, the Scope component is the JOBNAME that is returned from the IAZXJSAB READ request in operation 306, which is the name of the address space that can be used to correlate the user ID with a specific address space deployment in the Sysplex. Both the address space name and associated user ID may be obtained independently by the remote log reader component 220. The Source Location component is the IP address of the partner process whose access needs to be verified—this is the IP address of the container 260 where the capture component 262 is running. The IP address was chosen since it may be independently obtained and is relatively hard to spoof. Put differently, if an entity is able to spoof the IP address, the system is likely seriously compromised already.

After this is an optional application name hierarchy that can be validated. These names are provided by the application with the assumption that the security administrator can correlate these names with something they want to restrict access to, such as a file to be accessed in the file operation 370 described above. In some embodiments shown in FIG. 3, a period may be used to separate these different values (3-7A, 3-7B, 3-7C, and 3-7D, where x={2, 5, 7} shown in FIG. 3) that make up the resource name being checked. However, any separator or delimiter value may be used. In some embodiments, the separator/delimiter may be required to conform to the SAF resource naming conventions.

In some embodiments, the resource profiles 234 represent proxies for an administrative or physical object to be secured. If the data resident operating system 210 has granted access (in the above examples, it is the control authority—but this is not a strict requirement), the assumption is that the application has the right to continue; otherwise, the application should stop because it is not authorized.

From a replication perspective, in some embodiments, the object names chosen for VSAM replication may comprise:

A subscription name, which represents a connection between capture and apply hosted at a specific remote location. An 8-character (unique) source system ID may be used for resource name construction.

A VSAM base cluster name, which is a part of the source data 215 and which uniquely identifies a VSAM file in the source Sysplex.

Independently, the user ID associated with the remote log reader address space needs at least READ authority to be able to access the VSAM files for refresh purposes, and browse access to a system log reader where the changes are staged for a subscription. The system log reader may be associated with a log provider whom the remote log reader accesses via log provider APIs, and the log provider (e.g., IXGLOGR on z/OS) abstracts the physical storage of the data from the reader. A user must be able to browse data from the log provider or that user cannot read logged changes for the datastore. This is similar for other datastores as well—the user needs access to the logged data and any APIs used to read that logged data.

These requirements are enforced by the APIs that are used to access these objects by the remote log reader component 220. The APIs to read files 215 and replication logs 222 also do their own access validation checking using the USERID associated with the address space where the remote log reader component 220 is running (the OS started task 230). These authorization checks do not have the granularity of the resource profile checks and cannot distinguish between a refresh operation for subscription A (not shown) versus a refresh operation for subscription B (not shown).

The approach, described above and commonly referred to as IP security (IPSec), of restricting access to a specific IP address is conceptually like setting up NETACCESS security in an operating system communications manager in conjunction with the SAF, which is another mechanism that may be used by a security administrator to control which IP address can connect to a specific port number—which may be more difficult to set up than the present approach. The approach described here represents a simpler solution than using a NETACCESS approach, but produces the similar results. There is also nothing precluding an embodiment from supporting NETACCESS validation versus this solution, or in addition to this solution.

Various embodiments use a different approach than the traditional user or group profile approach to securing access to operating system resources. This approach allows the container 260 to obtain operating system information permissible through these profiles, regardless of which specific user is asking for it. Furthermore, the customers may control the user's ability to make the request by limiting access to the container. These are effectively trusted internal systems with groups of users accessing the data under a secondary authentication of the trusted connection of the internal systems. And, in effect, this provides what customers want group access to the data without requiring the customers configure these users to be in a defined (e.g., privileged) group on the operating system.

Various embodiments disclosed herein are advantageous in that they strike a balance between security, cost, and complexity, however the invention is not limited to embodiments that provide these or other advantages mentioned herein. It provides for secure data and ensures that the data is allowed to be accessed where access has been allowed, without requiring each operational user to have all profiles to read the data individually just to restart replication between the site's endpoints. To illustrate by way of example, a command center may exist where the user is responsible for restarting replication if there is a failure. Various embodiments disclosed herein give the customer site tools to allow such a restart without requiring each user to have all the profiles necessary on the data resident OS to access the data directly. As users change roles or new users enter the system, this all may remain static. If the users are in the command center, they can perform the operations necessary to restart replication.

Advantageously, this approach allows a securing of data to another remote system, based on a network address, such as an IP address, and providing more discrete control over that data than what known systems, such as IPSec, offer. Although such known systems can prevent two systems from communicating and can also restrict port access, these systems do not allow for doing that while at the same time limiting the data that can be accessed by the remote peer. This approach further allows the ability to secure the data by protecting who can access the remote system IP address. Anyone in the group may become implicitly allowed to see the data because the OS resident system may be defined to allow some subset of data to flow to this remote system.

Technical Application

The one or more embodiments disclosed herein accordingly provide an improvement to computer technology. For example, an ability for authenticating access to a non-relational data store for a user, without having to establish credentials for the user, may balance an acceptable level of computer system security at reduced administrative costs and complexity in a networked architecture.

What is claimed is:

1. A computer implemented method for securing an access of a data object in a datastore by a remote system without user-specific credentials, the method comprising using a processor of a data resident operating system for:

verifying, using a security resource profile for the datastore, which access entity the remote system has access to, but without the user-specific credentials;

providing the security resource profile through a security application program interface (API) to the processor to determine whether access to the access entity should be allowed; and allowing the access to the data object by the remote system when the security resource profile exists and permits the access;

wherein:
the security resource profile further specifies, for the access entity, a jobname and an Internet Protocol (IP) address that the remote system has access to;
the security resource profile comprises a rule having a specific permission level allowing access to the access entity for the remote system based on the data resident operating system and an administrative and capture components system as one of remote systems being known entities of an access server; and
access to a second access entity is denied in an absence of a second rule related to the second access entity.

2. The method of claim 1, wherein the security resource profile further specifies, for the access entity, a subscription identifier or a grouping object.

3. The method of claim 2, wherein the security resource profile further specifies, for the access entity, a data object.

4. The method of claim 1, further comprising:
obtaining the jobname directly from the data resident operating system; and
obtaining the IP address directly from a Transmission Control Protocol/Internet Protocol (TCP/IP) connection.

5. The method of claim 1, wherein the IP address is an address of the administrative and capture components system that processes the data object from the data resident operating system where the security resource profile is validated, the method further comprising:
constructing a resource name from the IP address for a basic access authorization.

6. The method of claim 5, further comprising:
further constructing the resource name by appending a unique name of a subscription or a grouping name used to indirectly control or authorize a right to capture and replicate changes to the data object to the administrative and capture components system and, indirectly, to a set of related objects on a target system that is one of the remote systems, wherein the subscription establishes a connection between a capture component and the target system.

7. The method of claim 6, wherein the set of related objects are virtual storage files.

8. The method of claim 6, wherein the set of related objects are information management system databases.

9. The method of claim 6, further comprising:
further constructing the resource name by appending a source data identifier.

10. The method of claim 9, wherein the source data identifier is a data set name (DSN).

11. The method of claim 5, further comprising attempting to obtain authentication access to the access entity using the resource name.

12. The method of claim 11, further comprising, based on a failure to obtain the authentication access, performing an error handling selected from the group consisting of: a) terminating a connection to the administrative and capture components system; and b) reporting an error.

13. The method of claim 1, further comprising replicating the data object using a capture component of the remote system from the datastore to a target data replica on a target system of the remote system dependent upon whether access is permitted by the security resource profile.

14. The method of claim 1, wherein the data object is a non-relational data object of an operating system.

15. The method of claim 1, further comprising creating an accessor environment element (ACEE) associated with a user-ID that operates as a user-ID control block.

16. A computer system for securing an access of a data object in a datastore by a remote system, comprising:
a memory; and
a processor that is configured to:
verify, using a security resource profile for the datastore, which access entity the remote system has access to, but without the user-specific credentials;
provide the security resource profile through a security application program interface (API) to the processor to determine whether access to the access entity should be allowed; and
allow the access to the data object by the remote system when the security resource profile exists and permits the access;

wherein:
the security resource profile further specifies, for the access entity, a jobname and an Internet Protocol (IP) address that the remote system has access to;
the security resource profile comprises a rule having a specific permission level allowing access to the access entity for the remote system based on the data resident operating system and an administrative and capture components system as one of remote systems being known entities of an access server; and
access to a second access entity is denied in an absence of a second rule related to the second access entity.

17. The apparatus of claim 16, wherein the security resource profile specifies, for the access entity, a subscription identifier, and a data object that the remote system has access to.

18. A computer program product for securing an access of a data object in a datastore by a remote system, the computer program product comprising:
one or more computer readable storage media, and program instructions collectively stored on the one or more computer readable storage media, the program instructions comprising program instructions to:
verify, using a security resource profile for the datastore, which access entity the remote system has access to, but without the user-specific credentials;
provide the security resource profile through a security application program interface (API) to the processor determine whether access to the access entity should be allowed; and
allow the access to the data object by the remote system when the security resource profile exists and permits the access;

wherein:
the security resource profile further specifies, for the access entity, a j obname and an Internet Protocol (IP) address that the remote system has access to;
the security resource profile comprises a rule having a specific permission level allowing access to the access entity for the remote system based on the data resident operating system and an administrative and capture components system as one of remote systems being known entities of an access server; and
access to a second access entity is denied in an absence of a second rule related to the second access entity.

* * * * *